US008245725B2

(12) United States Patent
Magnaval et al.

(10) Patent No.: US 8,245,725 B2
(45) Date of Patent: Aug. 21, 2012

(54) PRESSURE RELIEF DEVICE

(75) Inventors: Jean-Louis Magnaval, Saint Laurent du Var (FR); Jean Armiroli, Beaulieu sur Mer (FR); Pascal Audineau, Ventimiglia (IT)

(73) Assignee: BorgWarner Inc., Auburn Hills, MI (US)

( * ) Notice: Subject to any disclaimer, the term of this patent is extended or adjusted under 35 U.S.C. 154(b) by 894 days.

(21) Appl. No.: 11/922,081

(22) PCT Filed: Jun. 13, 2006

(86) PCT No.: PCT/FR2006/001331
§ 371 (c)(1),
(2), (4) Date: Jan. 5, 2009

(87) PCT Pub. No.: WO2006/134264
PCT Pub. Date: Dec. 21, 2006

(65) Prior Publication Data

US 2009/0217989 A1 Sep. 3, 2009

(30) Foreign Application Priority Data

Jun. 15, 2005 (FR) .................................... 05 06064

(51) Int. Cl.
*F16K 17/20* (2006.01)

(52) U.S. Cl. ......................... 137/472; 137/470; 137/471

(58) Field of Classification Search ........... 137/469–472
See application file for complete search history.

(56) References Cited

U.S. PATENT DOCUMENTS 3,195,556 A * 7/1965 Norstrud et al. .............. 137/469
RE28,842 E * 6/1976 Butterfield .................... 137/470
4,062,336 A * 12/1977 Gant et al. .................... 123/506
4,706,705 A * 11/1987 Lee, II ....................... 137/514.5
4,721,289 A * 1/1988 Hennells .................... 267/64.28
4,736,083 A * 4/1988 Saville ......................... 219/686
5,170,818 A * 12/1992 Hatzikazakis ................ 137/469
6,244,253 B1 * 6/2001 Haeberer et al. .............. 123/514
6,953,054 B2 * 10/2005 Oba et al. .................. 137/539.5
2001/0052361 A1 * 12/2001 Kushida et al. ............ 137/539.5

FOREIGN PATENT DOCUMENTS

EP 1251266 A1 * 10/2002
WO WO 02/44549 * 6/2002

* cited by examiner

*Primary Examiner* — Craig Schneider
*Assistant Examiner* — Jessica Cahill
(74) *Attorney, Agent, or Firm* — Warn Partners, P.C.

(57) ABSTRACT

A pressure relief device usable in a high-pressure fluid circuit for limiting the pressure in the case of a failure of a circuit component is provided, the device includes a body with a pusher sliding therein and axially movable by a spring. A ball seals an orifice connecting a chamber receiving a high-pressure fluid and another chamber. The other chamber includes at least one fluid discharge opening and the ball being held by the spring in a position closing the orifice below a predetermined pressure. The pusher devoid of axial through channels for the fluid, slides in the body and closes at least partially each discharge opening. At least one of discharge openings is connected to an opening also embodied in the body and open at least partially to the opposite side of the pusher.

2 Claims, 3 Drawing Sheets

PRESSURE RELIEF DEVICE

The present invention relates to a pressure relief device usable in a high-pressure fluid circuit for limiting the pressure in the case of a failure of one of the circuit components. Indeed, it involves a pressure relief valve usable for example in common rail fuel injection systems.

The device in question provides a safety and protection function for the system by reducing pressure in the event of a problem in the operation of one of the control components (injector, pressure sensor, flow regulator). In this example, which will constitute the topic of the present description, the pressure relief valve is subjected to the high pressure of the injection system, the pressure which exists inside the common rails used for injection in engines. This pressure may range from 200 to 2000 bars, depending on the systems.

This type of relief valve is traditionally made up of a body, forming an outer jacket, wherein slides a pusher axially movable by return means in such a way that it drives sealing means of an orifice connecting an upstream chamber receiving a high-pressure fluid and a downstream chamber. Said downstream chamber is delimited by the wall of the body, the side of the pusher and the wall across from which the sealable hole is formed. The upstream chamber then comprises at least one fluid discharge opening, for example traveling to the vehicle's tank. To be able to play its role as a relief valve only in case of problems, the sealing means are held by the return means in the position closing the orifice below a predetermined pressure threshold in the upstream chamber. This threshold is determined by the use of return means having a suitable caliber.

In the devices of the prior art, the sealing means are generally made up of a ball which seals a conical seat formed in the perforated wall of the orifice connecting the chambers, the ball then being stuck against said seat by the action of the spring on the pusher.

When the action due to the pressure existing in the high-pressure circuit (i.e. in the common rail) becomes greater than the initial load of the spring, the ball moves and, in principle, makes it possible to limit pressure by releasing the surplus flow toward the upstream chamber, then escaping toward a tank. In the known relief devices, the pusher comprises a protrusion allowing it to exert an action on the ball. In the sealing position, this protrusion is also provided with a length such that the relief opening(s) for the fluid existing in the upstream chamber are not covered by the pusher, which leaves these openings totally functional in all circumstances. The pusher also comprises flat axial areas allowing the passage of the fluid toward the opposite side of the pusher, that on which the spring acts.

In reality, however, this configuration results in causing the relief pressure to rise when flow increases, under the combined effect of the hydraulic stiffness, which is related to the dynamic of the fluid in the expansion phase, and the stiffness of the spring. In other words, and calculating the equation of this curve confirms it, the relief pressure follows a characteristic curve according to which pressure increases when the flow increases from the threshold value for opening the orifice.

However, this device is a safety member, supposed to limit the pressure increase so as to avoid damaging system components. For it to correctly fill its role, it would therefore be necessary, when the sealing means open, for the pressure to decrease or, at worst, remain constant.

This is not the case for the devices used to date, which establish an inverse effect, since the pressure continues to increase when the flow increases.

The present invention proposes to resolve this drawback, and to promote a solution making it possible to achieve a real decrease in the value of the pressure in the high-pressure circuit when the relief valve is open. To this end, the constructive arrangement that is the object of the invention enables compensation for the hydrodynamic effect which was not taken into account in the earlier devices. This compensation aims primarily to reduce the pressure gradient when the flow to be released increases.

According to the invention, to achieve this objective, the pusher is devoid of axial through channels for the fluid and slides with a small running clearance in the body. Its size is furthermore selected such that it makes it possible to close at least partially each discharge opening, at least one of which is connected to an opening also embodied in the body and open at least partially to the opposite side of the pusher, so as to provide a back pressure.

Covering the discharge openings creates a hydraulic restriction to the rights of said openings. And, under the effect of the discharge flow, this restriction and the absence of through channels in the pusher creates an overpressure in the upstream chamber, which acts on the pusher and decreases the action of the spring according to the intensity of the flow.

Increasing the pressure in the high-pressure circuit is thus controlled in the sense of limitation when the flow increases.

The concurrent existence of an opening embodied in the body on the other side of the pusher and connected to the discharge openings indeed allows the creation of a pressure differential on both sides of the pusher.

All in all, the overpressure caused by the discharge flow from the side of the hydraulic restrictions on one hand, and the return pressure on the other side of the pusher on the other hand, result in generating, on the latter, an effort which opposes the action of the spring and decreases its load according to the discharge flow.

Preferably, as has already been the case in its precursors, the pressure relief device of the invention comprises sealing means consisting of a ball housed in a hemispheric seat whereof the bottom is pierced with the orifice connecting the upstream and downstream chambers.

The ball also cooperates with a protrusion axially exceeding the pusher and which exerts axial action thereon.

This protrusion, in addition to its function of transmitting movement from the pusher to the ball, is particularly well-adapted to the configuration that is the object of the invention. Preferably, the hemispheric seat is indeed arranged at the bottom of an axial well leading into the upstream chamber, which extends the orifice connecting the chambers and is able to house the protrusion exceeding the pusher.

The existence of the well is made almost necessary by the performances of the device according to the invention, which result in better compensating for the action of the return means when flow increases, which may involve more significant movement of the pusher when it moves away from the seat of the ball.

To avoid losing the ball, it is then important for the axial protrusion exceeding said pusher to sink into the abovementioned well, to hold the ball there even when it moves away from the seat.

According to one possible alternative, the axial protrusion exceeding the pusher and the ball are integral.

For production reasons, the upstream chamber, the orifice connecting the upstream and downstream chambers, and the seat of the sealing means are arranged in a single piece closing one end of the boy.

This piece, manufactured separately, is simply fixed to one of the ends of the body, closing the bore wherein slides the pusher.

Preferably, the return means consist of a compression spring. In this case, the ends of the spring are fixed on two axial contacts exceeding the pusher and a stopper closing the end of the body opposite the high-pressure chamber, respectively.

In terms of production, said stopper follows the same logic as the piece wherein the seat of the ball is formed.

According to one preferred embodiment, the upstream chamber comprises two discharge openings, as already mentioned, which make it possible to send the fluid discharged by the high-pressure circuit toward a fuel tank, for example.

The invention will now be described in reference to the appended figures, in which.

Figure 1:
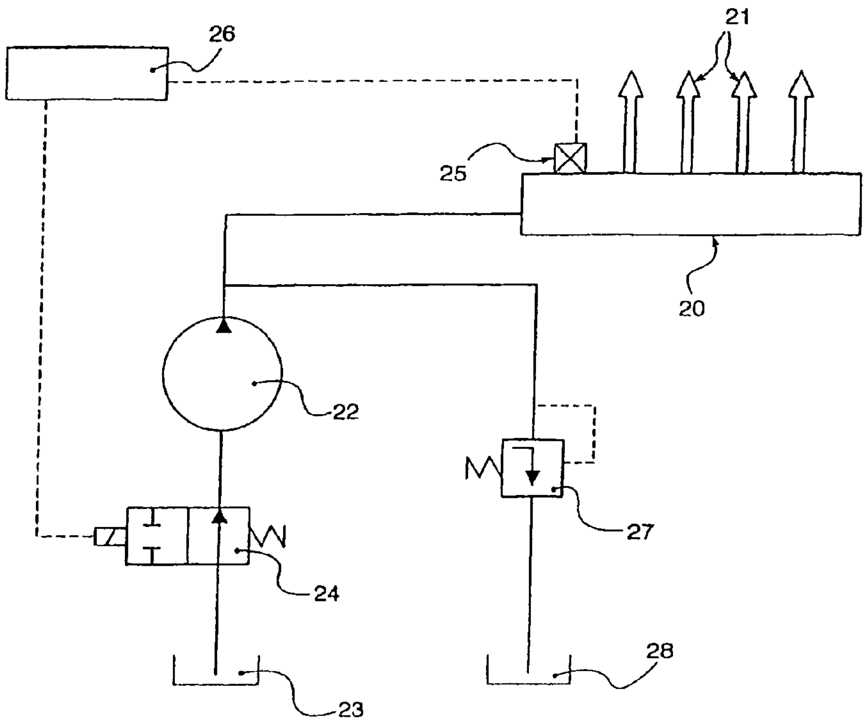
FIG. 1 shows the general diagram of a fuel injection system provided with a pressure relief device according to the invention.

In reference to FIG. 1, the common rail (20) containing the injectors (21) is supplied with fuel by a high-pressure pump (22) extracting the fuel from a tank (23) through an input flow-regulating solenoid valve (24). A pressure sensor (25), also arranged in the common rail (20), is connected to an electronic central unit (26) which controls the solenoid valve (24) in particular.

The system's pressure is limited, in case of a failure of one of the circuit control components, by discharging the flow toward the return drain of the pump (22). This discharge is done in the pressure relief device (27) which constitutes the invention. The fuel thus evacuated is returned toward a tank (28).

Figure 2:
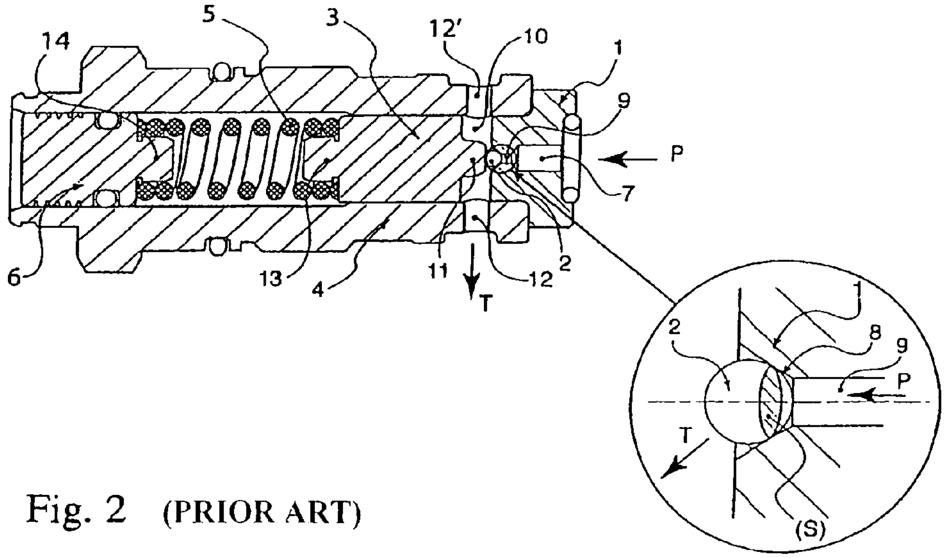
Fig. 2 (PRIOR ART)
FIG. 2 shows a relief device of the prior art, with an enlargement of the sealing ball and its seat.

The pressure relief device (27) is in this case a purely mechanical component. Those which are used today, one example of which is shown in FIG. 2, are based on a cylindrical body (4) forming the outer jacket of the relief device, and provided with a central bore wherein a pusher (3) can slide. Its front end is covered on one hand by a piece (1) at which the connection to the high-pressure circuit is made, and on its rearward end by a stopper (6).

The action of the high-pressure fluid is symbolized by the arrow P. This fluid is first admitted into an upstream high-pressure chamber (7) embodied in the piece (1), which is connected to the seat (8) of the ball (see enlargement) through an orifice (9).

The seat (8) of the ball (2) widens toward a downstream chamber (10) delimited by the inner wall of the piece (1), the side of the pusher (3) and the inner wall of the body (4).

The ball (2), which serves as sealing means, is stuck against its seat (8) by an axial protrusion (11) exceeding the pusher (3). In the closed position of the orifice (9), as shown in FIG. 2, this protrusion (11) has a length such that the axial dimension of the upstream chamber (10) thus created is sufficient to prevent any covering of the axially aligned lateral discharge openings (12, 12') by the pusher (3). The discharge openings (12, 12') are axially spaced from a forward end of the body (4). The state of equilibrium in the sealing position results from the existence of a spring (5) which returns the pusher (3), and consequently the ball (2), to the sealing position.

The two ends of this spring (5) are centered at the pusher (3) and the stopper (6), respectively, by axial contacts (13, 14) which exceed it. The fluid discharged from the high-pressure circuit toward the upstream chamber (10) when the ball (2) ceases to seal the orifice (9) is discharged to a tank, which is symbolized by the arrow T.

In this configuration, the equilibrium of the ball during a discharge phase is governed by the following relationship:

$$F_{RO}+K_R+X_b=(P_{rail}-\Delta P_{hydrodynamic})\times S_F \quad (1)$$

Where:

$F_{Ro}$: initial effort of the spring on the ball;

$K_R$: stiffness of the spring;

$X_b$: release of the ball;

$P_{rail}$: system pressure;

$\Delta P_{hydrodynamic}$: pressure decrease to the right of the closing section due to attainment of normal operating speed;

$S_F$: closing section.

$\Delta P_{hydrodynamic}$ is directly dependent on the flow and therefore the closing section as well as the release of the ball.

$$\Delta P_{hydrodynamic}=KP_{hydrodynamic}/S_F\times X_b(Q)$$

where $KP_{hydrodynamic}$: hydrodynamic stiffness of the ball/seat sub-assembly.

By replacing in (1), we obtain:

$$P_{rail}=1/S_F[F_{Ro}+X_b(Q)(K_R+KP_{hydrodynamic})]$$

Figure 3:
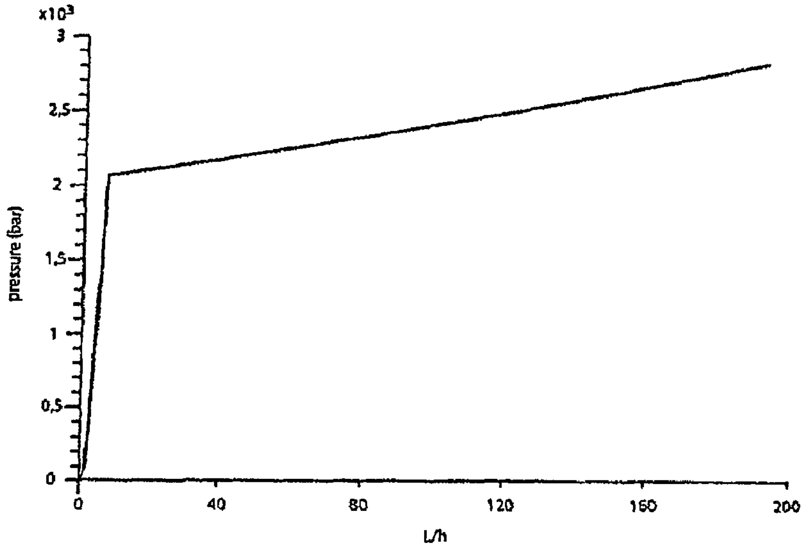
FIG. 3 illustrates the pressure curve in the high-pressure circuit according to the flow obtained with a configuration of this type.

The characteristic curve which corresponds to this equation is that which appears in FIG. 3. It clearly results from this that from a threshold value for opening of the ball (2), the discharge pressure follows a characteristic law such that it rises as the flow increases. This results, as shown in equation (1), from the hydraulic stiffness and the stiffness of the spring.

This type of operation is not compatible with the safety requirement attached to this type of device.

Figure 4:
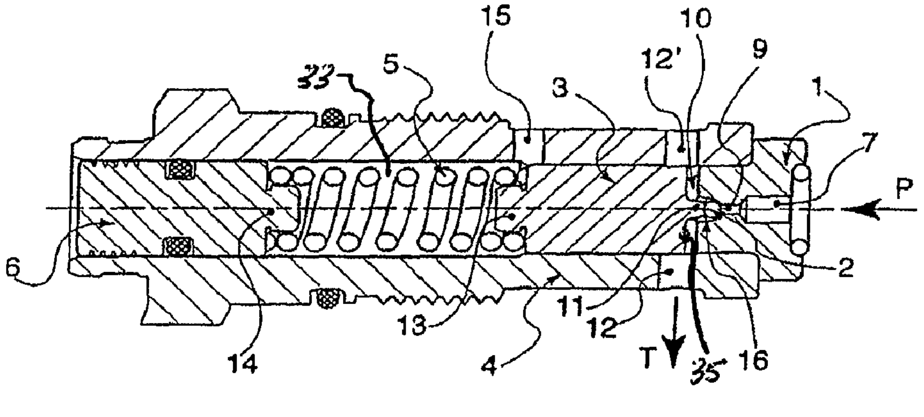
FIG. 4 is a cross-section of the configuration which is the object of the present invention.

The modified configuration that is the object of the invention, and appears in FIG. 4, improves a certain number of constructive arrangements to resolve this drawback.

In this new configuration, the reference numbers were preserved when they were applicable to components or elements already found in the configuration of the prior art.

With regard to the latter, the major modifications concern the pusher (3), the positioning of the seat (8) and the existence of an additional opening (15) in the body of the body (4) forming a sealed control volume (33) within the body rearward of the pusher. Forward the pusher 3 is the chamber 10 which is exposed to the valve piece 1. The pusher has a frontal face with a radial majority portion (35) of the frontal face perpendicular to the body central bore with a frontal face center portion connected with the protrusion (11), the frontal face portion partially throttling the discharge openings 12, 12' from an initial position with the ball 2 contacting the orifice 9. The opening (15) is axially spaced from the discharge openings (12, 12').

The pusher (3), currently devoid of axial passages for the fluid, is furthermore sized such that it has a front face with a radial majority frontal portion 31 being perpendicular to the body (4) central bore. The pusher has a frontal face central portion connected protrusion when the pusher (3) holds the ball (2) against its seat (8), it encroaches upon the surfaces of the openings (12, 12'), thereby creating a hydraulic restriction to the rights of these openings. Under the effect of the discharge flow, an overpressure is created in the chamber (10). The opening (15), connected to at least one of the openings (12, 12'), imposes, on the side of the pressure barrier pusher (3) at which it opens, a pressure identical to the pressure of the discharging fluid as it is found at the openings (12, 12').

The two transverse sections opposite the pusher (3) therefore receive a different pressure. This differential creates, on the pusher (3), an effort which opposes the action of the spring, and makes it possible to decrease, according to the discharge flow, the load of the spring (5) on the ball (2).

In this case, the effort received by the ball (2) from the pusher (3) is:

$$F_{RO}+K_R \times X_b - P_A(Q) \times S_p$$

Where:

$F_{RO}$: initial effort of the spring on the ball;

$K_R$: stiffness of the spring;

$X_b$: release of the ball;

$P_A$: differential pressure in the chamber (10) generated by the pusher/body covering;

$S_P$: pusher cross-section.

In considering equation (1), we obtain:

$$P_{rail}=1/S_F[F_{RO}+X_b(Q)(K_R+K_{Phydrodynamic}-\beta_A)]$$

With $\beta_A=P_A(X_b)\times S_P$, according to the pressure in the chamber (10) generated by the discharge flow.

Figure 5:
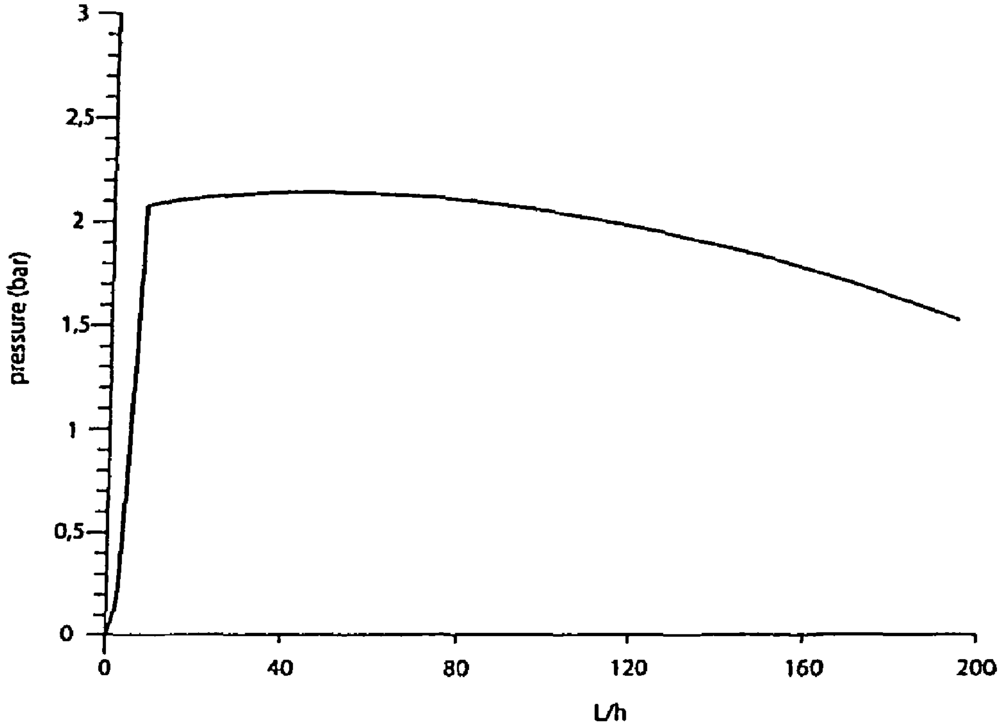
FIG. 5 illustrates the pressure curve according to the flows obtained with this new configuration.

The new value of $P_{rail}$ results in a characteristic curve of the pressure in the rail according to the flow as illustrated in FIG. 5.

It then clearly appears that the new configuration makes it possible to decrease the pressure in the high-pressure circuit even when flows increase, which is in keeping with the purpose of the product.

Given the pressure differential which exists between the chamber (10) and the side of the pusher (3) cooperating with the spring (5), the movement of said pusher (3) can be substantially more significant than in the versions of the prior art. In order to avoid losing the ball (2), its seat (8) was then arranged at the bottom of a well (16) which also guides and centers the protrusion (11) exceeding the pusher (3) during production. The protrusion (11) always prevents the ball (2) from coming out.

The configuration according to the invention in particular enables a significant reduction of the dimensions of the relief device according to the invention. It does, however, only constitute one possible example of an embodiment of the invention.

The invention claimed is:

1. A pressure relief device usable in a high-pressure fluid circuit for limiting the pressure in case of a failure of a circuit component comprising:

a cylindrical body having a central bore, said cylindrical body having a stopped end toward a rearward end, said body having generally axially aligned lateral discharge openings axially spaced from a forward end of said body, a connective opening axially spaced from said discharge openings and wherein one of said discharge opening is connected with said connective opening;

a valve seat piece closing off said body forward end, said valve seat piece having an upstream high pressure chamber, an orifice connected with a hemispheric seat arranged at an axially forward end of an axial well extending into said orifice, and said valve seat piece having a downstream chamber;

a ball housed within said hemispheric seat for controlling fluid flow through said orifice; and a pusher devoid of an axial passage body mounted within said body central bore, said pusher having an axial protrusion for contacting said ball, and said pusher being biased by a compression spring within said bore to contact said ball to seal off said orifice, said pusher providing a pressure barrier dividing said central bore to a sealed control volume exposed to said connective opening and to another portion exposed to the valve piece downstream high pressure chamber, said pusher having a frontal face with a radial majority portion of said frontal face being perpendicular to said body central bore with a frontal face center portion connected with said protrusion, said frontal face majority portion partially throttling said discharge opening from an initial position with said ball contacting said orifice.

2. Pressure relief device according to claim 1, wherein the axial protrusion exceeding the pusher and the ball are integral.

* * * * *